Jan. 8, 1957 J. G. McMILLAN, JR., ET AL 2,776,964
MANUFACTURE OF NITROCELLULOSE
Filed March 28, 1956 2 Sheets-Sheet 1

JAMES G. McMILLAN, JR
WARREN L. PLUNKETT
INVENTORS

BY Ernest G. Peterson

AGENT.

JAMES G. McMILLAN, JR
WARREN L. PLUNKETT
INVENTORS

United States Patent Office 2,776,964
Patented Jan. 8, 1957

2,776,964

MANUFACTURE OF NITROCELLULOSE

James G. McMillan, Jr., Red Bank, and Warren L. Plunkett, Sayreville, N. J., assignors to Hercules Powder Company, Wilmington, Del., a corporation of Delaware Application March 28, 1956, Serial No. 574,481

11 Claims. (Cl. 260—220)

This invention relates to a continuous system for the production of nitrocellulose wherein a nitrating mixture essentially containing nitric acid, magnesium nitrate, and water is employed.

Copending application, Serial No. 574,388, filed March 28, 1956, by Bennett, Brooks, McMillan and Plunkett discloses and claims novel nitric acid esters of cellulose and their preparation by a new method involving nitrating mixtures containing nitric acid, magnesium nitrate, and water as essential ingredients. The method of nitration set forth in the above Bennett et al. application has several notable advantages over the well-known process for producing nitrocellulose which employs mixed nitric-sulfuric acids. To begin with, nitrating mixtures penetrate and wet even relatively dense aggregates of cellulose particles rapidly and uniformly in contrast to mixed nitric-sulfuric acids, and the nitration reaction is much more rapid. The new method of nitration provides stable nitrocellulose without the necessity for long, tedious stabilization treatment heretofore necessary with mixed nitric-sulfuric acids. Moreover, the nitrocelluloses produced are uniformly substituted and substantially completely soluble in acetone, and are free of unstable sulfur compounds. It is evident that these advantages and others make this new method of nitration attractive for the commercial production of nitrocellulose.

It is, therefore, a principal object of this invention to provide a continuous system for the production of nitrocellulose employing nitrating mixtures containing nitric acid, magnesium nitrate and water as essential ingredients.

It is a further object to provide a continuous system for the production of nitrocellulose wherein fresh nitric acid to replace that consumed in the nitration and lost in the system is employed to accomplish a highly important step in the system.

It is a further object to provide such a continuous system wherein a substantial part of the spent nitrating mixture adhering to the nitrocellulose after centrifuging or the like is recovered, and the nitric acid and magnesium nitrate values in such recovered spent nitrating mixture are re-used in the system.

Other objects of the invention will appear hereinafter, the novel features and combinations being set forth in the appended claims.

These objects are accomplished in accordance with the present invention by subjecting cellulose to a nitration reaction in which cellulose is reacted with a nitrating mixture essentially containing nitric acid, magnesium nitrate, and water to produce nitrocellulose; recovering spent nitrating mixture from the nitrocellulose; thereafter subjecting the nitrocellulose to a rapid displacement wash; recovering the discharge from the displacement wash; subjecting the nitrocellulose to a series of washes in rapid succession after the displacement wash in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash, and the recovered discharge from the first wash in a nitric acid concentrator using magnesium nitrate as the dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in HNO₃ content to the nitric acid consumed in the nitration and lost in the system.

A preferred embodiment of the invention has been chosen for purposes of illustration and description and is shown in the accompanying drawings forming a part of the specification wherein reference symbols refer to like parts wherever they occur.

Figs. 1 and 2, taken together, illustrate a diagrammatic flow sheet of the complete system.

Figure 1:
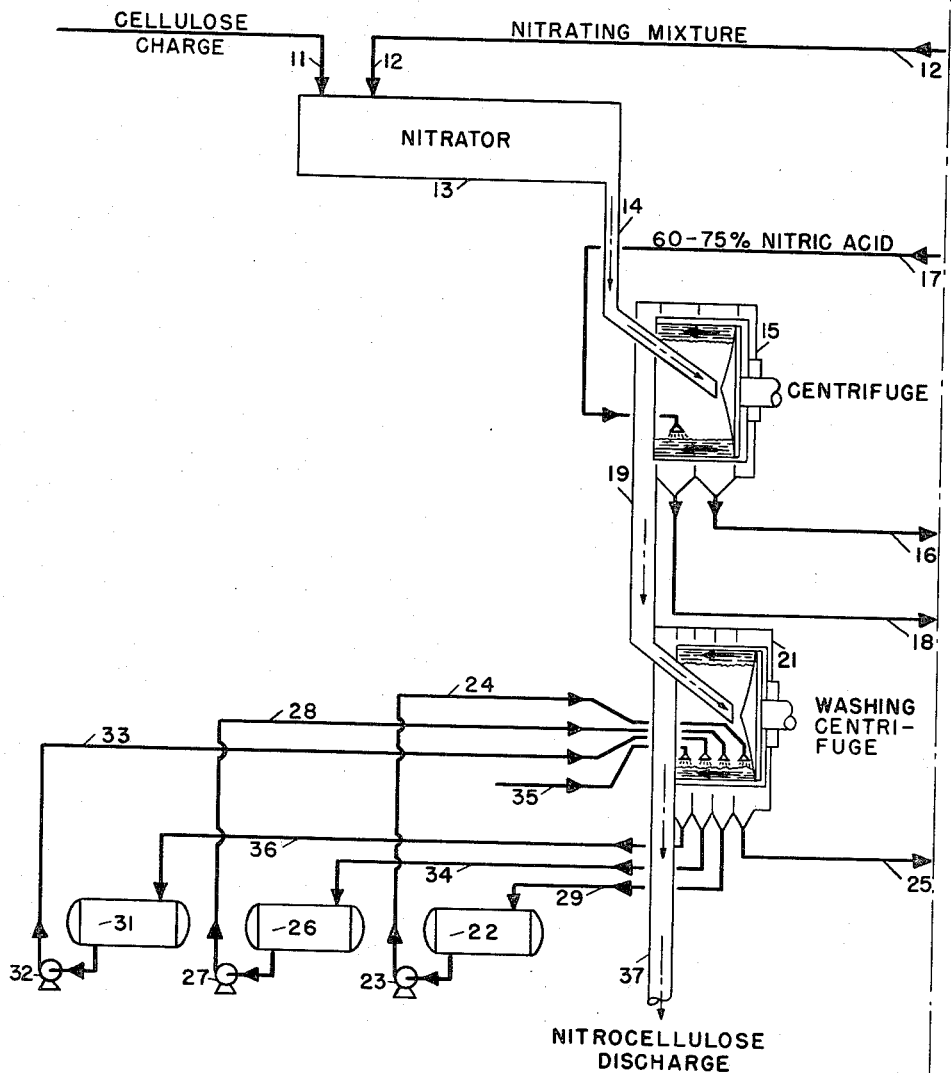
Fig. 1 illustrates the nitration, recovery of spent nitrating mixture, displacement washing with fresh 60–75% nitric acid, and the additional washing, recovery, and recirculation features of the invention.
Figure 2:
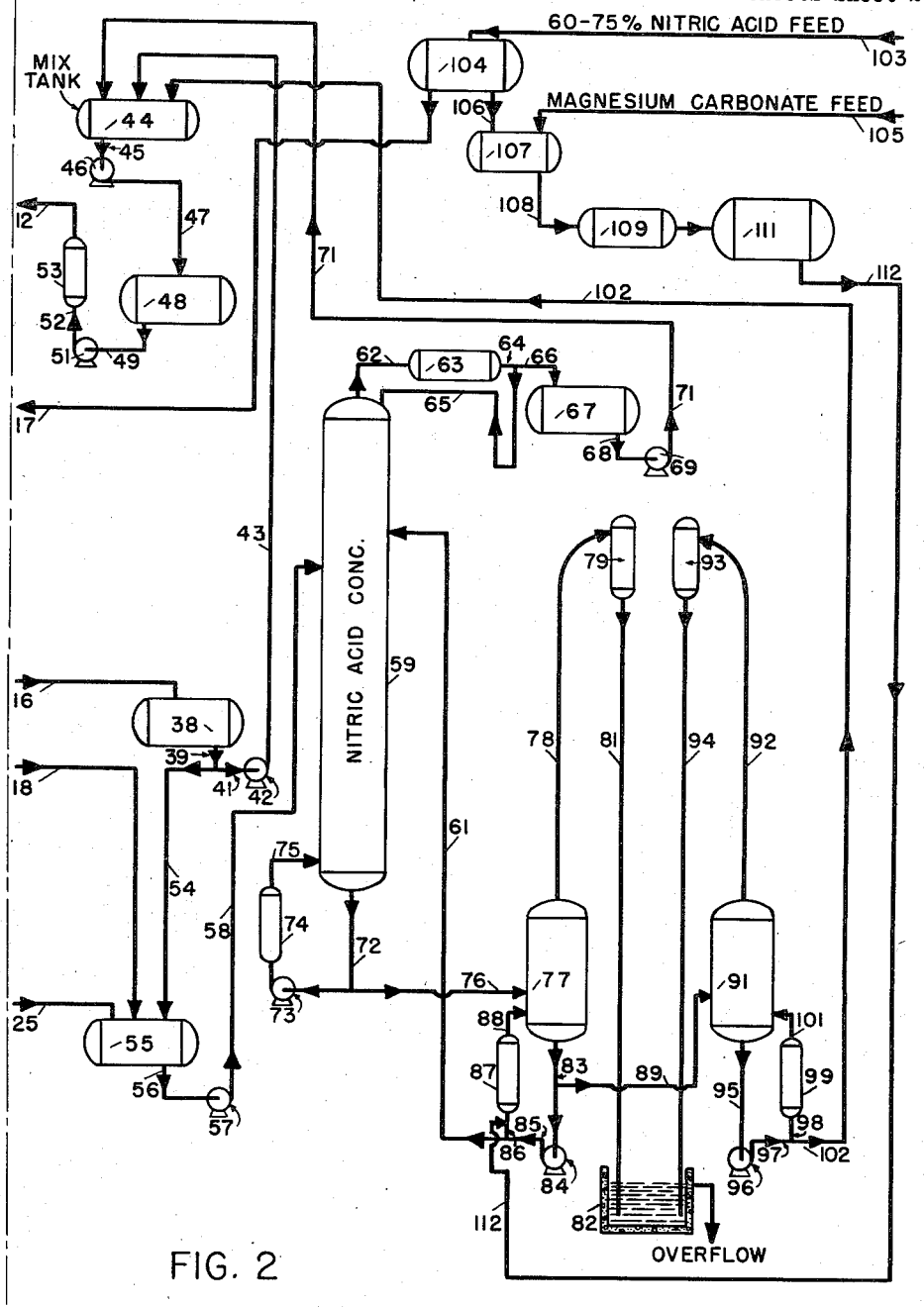
Fig. 2 illustrates spent nitrating mixture fortification, nitric acid concentration, magnesium nitrate recovery, magnesium nitrate concentration, and addition of fresh magnesium nitrate to the system.

With reference to the drawings, a suitable form of cellulose, such as shredded wood pulp or cotton linters, in predetermined amount is introduced through line 11 into a nitrating vessel 13 having suitable means of agitation. Nitrating mixture in predetermined amount, and previously heated, if desired, is simultaneously introduced through line 12 to the nitrating vessel 13. Following nitration, the nitrocellulose suspended in spent nitrating mixture is conveyed through line 14 to centrifuge 15 where the bulk of spent nitrating mixture is centrifuged off, passes through line 16, and is recovered in storage tank 38. The nitrocellulose is then given a displacement wash in the centrifuge with fresh nitric acid of about 60% to about 75% concentration introduced through line 17, and the discharge from this displacement wash passes through line 18 and is recovered in tank 55. The nitrocellulose is discharged from centrifuge 15 through line 19 to centrifuge 21 where it is subjected to a series of washes. The first wash is supplied from storage tank 22 to pump 23 and passes through line 24 into the centrifuge 21. The discharge from this first wash passes through line 25 and is recovered in tank 55. The second wash is supplied from storage tank 26 to pump 27, and passes through line 28 into the centrifuge 21. The discharge from the second wash passes through line 29 to the first wash storage tank 22. The third wash is supplied from storage tank 31 to pump 32, and passes through line 33 into the centrifuge 21. The discharge from the third wash passes through line 34 to the second wash storage tank 26. The final wash, preferably water, is supplied through line 35, and the discharge from the final wash passes through line 36 to the third wash storage tank 31. The washed nitrocellulose discharged from centrifuge 21 is withdrawn from the system through line 37 and may be passed into conventional equipment (not shown) for any desired additional subsequent treatment such as final purification, adjustment of viscosity, dehydration, and the like.

Part of the spent nitrating mixture from storage tank 38 passes through lines 39 and 41 to pump 42 and then through line 43 to mix tank 44, where it is fortified with predetermined amounts of concentrated nitric acid of about 98.5% concentration as fed through line 71 and concentrated magnesium nitrate of about 80% concentration as fed through line 102. The reconstituted nitrating mixture from mix tank 44 passes through line 45 to pump 46 and through line 47 to nitrating mixture storage tank 48, from whence it is recycled through line 49, pump 51, line 52, heater 53, and line 12 to the nitrating vessel 13.

The spent nitrating mixture accumulated in storage tank 38 passes through lines 39 and 54 into the nitric acid concentrator feed tank 55 which additionally serves as the recovery tank for the displacement wash and the first wash as supplied through lines 18 and 25, respectively, and as hereinbefore described. The nitric acid solution from feed tank 55 is fed through line 56 to pump 57 and passes through line 58 to the stripping zone in the upper portion of nitric acid concentrator 59. Recovered magnesium nitrate solution containing approximately 72% magnesium nitrate is simultaneously introduced through line 61 into the stripping zone in the upper portion of nitric acid concentrator 59 where it is employed as the dehydrating agent in the concentration of nitric acid. Substantially all of the nitric acid is taken off overhead from the nitric acid concentrator 59 as concentrated nitric acid vapors of approximately 98.5% concentration, which vapors pass through line 62 to condenser 63. Part of the condensed concentrated nitric acid is returned as reflux to the top of the nitric acid concentrator 59 through lines 64 and 65. The remaining condensed concentrated nitric acid is collected in concentrated nitric acid storage tank 67 through lines 64 and 66. From the storage tank 67 the concentrated nitric acid is fed through line 68, pump 69, and line 71 to mix tank 44 where it is employed to fortify the spent nitrating mixture.

Dilute magnesium nitrate solution substantially free of nitric acid is taken off as still bottoms from the nitric acid concentrator 59. Part of the still bottoms is recirculated through line 72, pump 73, boiling tubes 74, and line 75 to the nitric acid concentrator 59 to supply heat for the distillation of nitric acid. The remaining still bottoms pass through lines 72 and 76 to magnesium nitrate recovery still 77. Water vapor is taken off overhead through line 78 to condenser 79, and condensed water passes through line 81 to hot well 82. The still bottoms consist of recovered magnesium nitrate solution of approximately 72% concentration, part of which is recycled through line 83, pump 84, lines 85 and 86, boiling tubes 87, and line 88 to the magnesium nitrate recovery still 77 to supply heat for the distillation. Another portion of the recovered magnesium nitrate solution is recycled through line 83, pump 84, and lines 85 and 61 to the nitric acid concentrator 59 where it is employed as the dehydrating agent in the concentration of nitric acid. The remaining portion of the recovered magnesium nitrate solution is passed through lines 83 and 89 to magnesium nitrate concentrating still 91. Water vapor is taken off overhead through line 92 to condenser 93, and condensed water passes through line 94 to the hot well 82. The still bottoms consist of concentrated magnesium nitrate solution of about 80% concentration, part of which is recycled through line 95, pump 96, lines 97 and 98, boiling tubes 99, and line 101 to the magnesium nitrate concentrating still 91 to supply heat for the distillation. The remaining concentrated magnesium nitrate solution is conveyed through line 95, pump 96, and lines 97 and 102 to mix tank 44 where it is employed to fortify the spent nitrating mixture.

Fresh nitric acid of 60–75% concentration, to replace nitric acid consumed in the nitration and lost in the system, is supplied to the system through line 103, storage tank 104, and line 17 from which it is introduced into centrifuge 15. This fresh nitric acid is employed as the displacement wash hereinbefore described.

Fresh magnesium nitrate to replace that lost in the system is prepared by introducing predetermined amounts of magnesium carbonate through line 105, and predetermined amounts of fresh nitric acid of about 60–75% concentration through line 106 into reactor tank 107. The reaction mixture then passes through line 108 to filter 109 and from the filter into fresh magnesium nitrate storage tank 111. The fresh magnesium nitrate is supplied to the system from storage tank 111 through line 112 and then to the boiling tubes 87. The magnesium nitrate requirements of the system from there on are met as hereinbefore described.

This invention contemplates the use of any of the usual commercial forms of cellulose such as cotton, cotton linters, wood pulp, regenerated cellulose, and the like. Preferably the cellulose will be in bulk form such as shredded linters, shredded wood pulp, fluffed bulk fibers, granules, finely ground or cut fibers, and the like.

The nitrating mixtures in accordance with this invention contain three essential ingredients, namely, nitric acid, magnesium nitrate and water, the ratio of magnesium nitrate to water being at least about 1.2:1 and not more than about 2.2:1, preferably between about 1.3:1 and about 2:1, and the nitric acid being present in an amount sufficient to yield a nitric acid ester of cellulose having a nitrogen content of from about 11% to about 13.5% by weight. It will be understood, of course, that the sum of the three essential components will constitute substantially 100% of the nitrating mixture, any $N_2O_3$ being only an incidental ingredient in the nitrating mixture, since it is well recognized that concentrated nitric acid often contains small percentages of $N_2O_3$, usually on the order of 0.1% or less.

Although for most purposes the nitrating mixtures of this invention will usually contain between about 45% and about 94% nitric acid, between about 3.3% and about 34% magnesium nitrate, and between about 2.7% and about 21% water by weight, it is to be understood that the invention is not to be construed as limited in this respect, since the important feature is the ratio of magnesium nitrate to water as set forth hereinabove, nitric acid being present in an amount sufficient to yield a nitric acid ester of cellulose having a nitrogen content of from about 11% and about 13.5% by weight.

A more specific nitrating mixture suitable for preparing most types of nitrocellulose contains essentially between about 45% and about 80% nitric acid, between about 10% and about 34% magnesium nitrate, and between about 7% and about 21% water by weight, the ratio of magnesium nitrate to water being at least about 1.2:1 and not more than about 2.2:1, preferably between about 1.3:1 and about 2:1 by weight.

Nitration in accordance with this invention is an equilibrium reaction, the extent of nitration at equilibrium being governed primarily by the composition of the nitrating mixture. Thus, at any given nitric acid content within the limits set forth hereinabove, the nitrogen content of the resulting nitrocellulose increases with decreasing water content, in general, a decrease of 0.1% in the water content of the nitrating mixture causing a corresponding increase of about 0.05% nitrogen in the nitrocellulose, and vice versa. At the same time, for each change in water content there will necessarily be a corresponding inverse change in the magnesium nitrate content of the nitrating mixture. Similarly, at any given water content within the limits set forth hereinabove, the nitrogen content of the resulting nitrocellulose decreases with increasing nitric acid content, in general, an increase of 1% in the nitric acid content of the nitrating mixture causing a corresponding decrease of about 0.1% nitrogen in the nitrocellulose, and vice versa. Here, likewise, for each change in nitric acid content there will necessarily be a corresponding inverse change in the magnesium nitrate content of the nitrating mixture. Hence, within the above-stated operating limits there are numerous nitrating mixtures for preparing any particular nitrocellulose desired. Likewise, within the above-stated operating limits there are nitrating mixtures suitable for preparing substantially all commercial types of nitrocellulose. The particular nitrating mixture employed will, therefore, be largely a matter of choice governed primarily by economic considerations.

It is emphasized that cellulose can react with any quantity of the nitrating mixtures of this invention to form nitric acid esters of cellulose. However, in reacting cellulose with the nitrating mixtures of this invention, nitric acid is consumed and water is formed. From a practical consideration it is desirable to employ an excess of nitrating mixture over the theoretical stoichiometric requirements. With the customary nitrating equipment in common use in the industry and employing the customary forms of chemical cellulose, it is presently preferred to employ at least about 20 parts of nitrating mixture to 1 part of cellulose by weight so that the water formed in the reaction will not unduly dilute the nitrating mixture, but it is to be understood that the invention is not limited in this respect. With other forms of cellulose and/or other conditions of nitration less than 20 parts nitrating mixture to 1 part cellulose are quite feasible. It will be apparent that larger quantities can be employed such as 30, 40, 50, 60, 70, or even more parts per part of cellulose, as desired. However, the economics of the system will usually govern the ratio of nitrating mixture to cellulose, it being most economical to nitrate with the lowest ratio that will give a high quality product.

A wide range of temperatures can be employed in practicing this invention. For practical reasons, however, it is not desirable to employ temperatures below about 15° C. or higher than about 70° C. Below about 15° C. the reaction becomes too slow to be economically attractive, and above 70° C. the nitrocellulose dissolves and decomposes. A preferred range of temperatures lies between about 40° C. and about 60° C., with temperatures of about 50° C. being particularly suitable. These temperatures are readily attained by heating the nitrating mixture to the desired temperature prior to introduction into the nitrating vessel.

Nitration will ordinarily be continued until nitration is substantially complete and the resulting nitrocellulose is in equilibrium with the nitrating mixture. With the customary shredded or fluffed chemical cellulose at temperatures above 30° C. about 8 minutes are required to obtain a uniformly substituted nitrocellulose. Denser forms of cellulose such as granules and the like ordinarily require longer nitration times, in some instances as much as 45 minutes or more, under similar temperature conditions to achieve uniform substitution. In any case, nitration time is ordinarily held to a minimum consistent with obtaining a uniformly substituted product.

Following nitration the nitrocellulose is suspended as a slurry in spent nitrating mixture. The bulk of this spent nitrating mixture is separated from the nitrocellulose and is recovered for re-use in the system. As illustrated in the drawings, this is accomplished by centrifugation. It can also be accomplished by means of suction or similar means.

The nitrocellulose, still moist with retained spent nitrating mixture, is then subjected to a rapid displacement wash. This displacement wash is a very important feature of the invention with respect to the composition of the washing liquid employed, the amount of washing liquid employed, and the timing of the operation.

The composition of the washing liquid should be fresh nitric acid of about 60% to about 75% concentration substantially free of magnesium nitrate. However, traces of magnesium nitrate in the fresh acid would do no harm. One of the important functions of this displacement wash is to displace retained spent nitrating mixture relatively high in magnesium nitrate content with a nitric acid liquid much lower in magnesium nitrate content without substantially reducing the acid strength of the retained liquid at this stage in the production of nitrocellulose. Displacement of spent nitrating mixture with fresh nitric acid of about 60% to about 75% concentration avoids precipitation of magnesium nitrate in the nitrocellulose, which is important, and also improves overall recovery of magnesium nitrate. Nitric acid of concentrations below about 60% tends to cause magnesium nitrate to crystallize out in the nitrocellulose, making its removal in subsequent washing operations extremely difficult. Nitric acid of concentrations above about 75% tends to have a softening and gelling action on the nitrocellulose which is undesirable in that it makes washing out of residual spent nitrating mixture extremely difficult, and also tends to degrade the nitrocellulose.

The displacement wash in accordance with this invention employs an amount of fresh nitric acid of about 60% to about 75% concentration substantially equivalent in $HNO_3$ content to the nitric acid consumed in the nitration and lost in the system. It is emphasized that all of the fresh nitric acid added to the system to make up for nitric acid consumed and lost in the system is added as this displacement wash, and hence keeps the system in balance with respect to nitric acid content. This is highly important from the practical and economic aspects of operation. To illustrate, if, for example, the total nitric acid consumed in the nitration and lost in the system amounts to approximately 0.68 lb. $HNO_3$ per pound of nitrocellulose produced, then the amount of fresh nitric acid of about 60% to about 75% concentration introduced into the system as the displacement wash will be equivalent to 0.68 lb. $HNO_3$ per pound of nitrocellulose. Hence, when 60% nitric acid is employed as the displacement wash, the amount of fresh nitric acid introduced into the system will be approximately 1.13 lb. per pound of nitrocellulose.

After removal of the bulk of spent nitrating mixture from the nitrocellulose, the resulting nitrocellulose moist with retained spent nitrating mixture could be kept in this condition for several hours without being harmed if no moisture is allowed to contact it. Preferably, however, the displacement wash is initiated as soon as the bulk of spent nitrating mixture is separated from the nitrocellulose to minimize the chances of harming the nitrocellulose at this stage by undue exposure to moisture. Upon being initiated, the displacement wash must be rapid. This is important. With the usual shredded or fluffed forms of chemical cellulose it has been found that the displacement wash is accomplished in a matter of a few seconds, ordinarily about 10 seconds being required. It will be apparent that the density of the nitrocellulose aggregate being washed will have an influence on the time required for the displacement wash, very fluffy open aggregates requiring less time than more dense aggregates. Seldom, however, will the time for this displacement wash exceed 15 or 20 seconds.

The discharge from the displacement wash is recovered for re-use in the system.

Following the displacement wash, the nitrocellulose is subjected to a series of washes in rapid succession in which the discharge from the first wash is recovered and the discharge from each succeeding wash is recycled to the preceding wash. This washing schedule must be carried out rapidly in order to avoid degradation of the nitrocellulose. There should be no appreciable time lapse between the displacement wash and the first wash. Similarly, there should be no appreciable time lapse between the several washes making up the washing schedule in accordance with this invention. Preferably, the first wash follows immediately after the displacement wash without time lapse and is carried out rapidly in the shortest possible time. Similarly, the second, third, fourth, etc., washes each preferably follows the preceding wash immediately without time lapse and is carried out rapidly in the shortest possible time, in general, each wash requiring only a few seconds to accomplish. Ordinarily, only about 10 seconds are required for each wash step, the time requirements conforming generally with the time requirements for the displacement wash set forth hereinbefore.

It will be apparent from inspection of the drawings that the washing procedure in accordance with this invention is in effect a countercurrent washing procedure, for in practice each succeeding washing liquid is of decreased nitric acid concentration approaching 0 as the limit, the final washing liquid being either very dilute acid, or preferably water. Obviously, the number of such washes could be very large with very small decreases in nitric acid strength with each succeeding washing liquid. Ordinarily, however, the number of such washes will be held to as few as possible consistent with economic recovery of a substantial proportion of the nitric acid and magnesium nitrate values remaining in the nitrocellulose. Four or five washes are usually adequate for this purpose.

It will be apparent from the foregoing description that the wash discharge from each succeeding wash will be more concentrated with respect to both nitric acid and magnesium nitrate content than the washing liquid employed to produce that particular wash discharge. In practicing the invention, advantage is taken of this fact in building up the concentration of nitric acid and magnesium nitrate values in the wash discharges to a point where it is economically attractive to recover these values. This is accomplished by employing each wash discharge except the wash discharge from the first wash as the washing liquid in the preceding wash. The drawings illustrate an embodiment employing four washes after the displacement wash with fresh 60–75% nitric acid, wherein the discharge from the final wash (No. 4 wash) is recycled as wash No. 3, the discharge of which is recycled to wash No. 2, the discharge of which is recycled as wash No. 1, the discharge of which is recovered.

It will be apparent from the foregoing description that the quantity of liquid employed in each wash is governed primarily by the quantity employed for the final wash which can be very dilute acid, but preferably is water. The amount of liquid employed for the final wash, in turn, is governed largely by the practical and economic consideration of abstracting an equivalent amount of water from the system at some point further on in the operations. Hence, although larger amounts can be employed, it is desirable to hold the quantity of final wash, and therefore the other washes likewise, to a practical minimum consistent with accomplishing a satisfactory degree of washing without undue dilution of the recovered wash discharge. In practice, it has been found that this can be satisfactorily accomplished with approximately 0.06 to 0.2 gallon of final wash liquid per pound of nitrocellulose.

Although the washing procedure in accordance with this invention necessarily involves initiating the operations with previously prepared wash liquids of predetermined composition, it will be apparent that equilibrium conditions will be rapidly established, owing to the recirculation features of this invention, wherein the composition of each wash discharge is governed largely by the composition of the acid liquid adhering to the nitrocellulose entering the washing schedule and the number of washes making up the washing schedule. In a specific embodiment as illustrated by the drawings, wherein four washes are employed after the displacement wash, wherein fresh 60% nitric acid is employed as the displacement wash, and wherein water is employed as the final wash, it has been found that the wash discharge from the fourth or final wash contains between about 15% and about 25% nitric acid, the wash discharge from the third wash contains between about 25% and about 40% nitric acid, the wash discharge from the second wash contains between about 40% and about 50% nitric acid, and the discharge from the first wash contains between about 50% and about 60% nitric acid, and is recovered for re-use in the system. It will be understood, of course, that the composition and number of washing liquids set forth above are merely by way of example, and other compositions and numbers of washing liquids come within the scope of this invention.

The drawings illustrate two centrifuges in tandem for accomplishing separation and recovery of the bulk of spent nitrating mixture, the displacement wash, and the subsequent washing and recirculation features of this invention. Preferably these centrifuges are conventional continuous centrifuges adapted for washing operations and equipped with suitable curbs for separate recovery of the several discharges. It is emphasized that separation and recovery of spent nitrating mixture, the displacement wash, and the subsequent washing and recirculation features of this invention can be accomplished in a single centrifuge instead of two as illustrated. These operations can also be accomplished on conventional horizontal rotary vacuum filters.

Upon completion of the washing steps in accordance with this invention, the nitrocellulose is withdrawn from the system for subsequent additional purification, viscosity adjustment, dehydration, and the like, as desired. Approximately 85% or more of the nitric acid and magnesium nitrate values present in the retained spent nitrating mixture remaining in the nitrocellulose after centrifuging or the like is recovered for re-use in the system by the displacement wash with fresh nitric acid and the subsequent washing steps set forth. Hence, only about 15% or less of the nitric acid and magnesium nitrate values present in the retained spent nitrating mixture remaining in the nitrocellulose after centrifuging is left in the nitrocellulose when the latter is withdrawn from the system for subsequent conventional treatment as desired. These nitric acid and magnesium nitrate values which are still present in the nitrocellulose withdrawn from the system are considered for the purposes of this invention as lost in the system, and must be taken into consideration in determining the amount of fresh nitric acid and fresh magnesium nitrate to add to the system in order to keep it in balance.

A predetermined part of the spent nitrating mixture recovered by centrifuging or the like is fortified with predetermined amounts of concentrated nitric acid and concentrated magnesium nitrate solution and is then recycled as the nitrating mixture for the nitration reaction. It is important for economic reasons to employ nitric acid and magnesium nitrate solutions as concentrated as practically feasible in order to utilize the maximum amount of spent nitrating mixture in this way. It is presently preferred to employ 98.5 to 99% nitric acid and about 80% magnesium nitrate solution for this purpose.

The concentrated nitric acid for fortifying spent nitrating mixture is obtained by concentrating the remainder of the recovered spent nitrating mixture, usually referred to in the parlance of the art as "accumulated" spent nitrating mixture, the recovered discharge from the displacement wash and the recovered discharge from the first wash in a nitric acid concentrator using magnesium nitrate as the dehydrating agent. It is important that the nitric acid be concentrated in this manner to avoid unnecessary loss of magnesium nitrate in the recovery operations, and to avoid unnecessary introduction into the system of undesirable contaminates.

It is preferred to employ the method described and claimed in U. S. Patent 2,716,631 to Robert J. Bechtel for obtaining concentrated nitric acid.

Although the magnesium nitrate solution employed in the concentration of nitric acid having a concentration of approximately 72% can be employed to fortify the spent nitrating mixture of this invention, it is much more desirable for practical reasons to further concentrate the magnesium nitrate solution from the nitric acid concentrator to approximately 80% strength.

In order to keep the system in balance, it is necessary to introduce fresh magnesium nitrate into the system to replace that which is lost in the system, as hereinbefore set forth. In the embodiment illustrated by the drawings, this is accomplished by reacting the required amount of magnesium carbonate with fresh nitric acid of 60 to 75% strength and introducing the solution thus formed into the system in the magnesium nitrate recovery step. However, the invention is not limited in this respect, for it is obvious that various other means of adding fresh magnesium nitrate to the system are within the scope of this invention. By way of example, commercial magnesium nitrate hexahydrate can be melted and added to the system in the magnesium nitrate recovery step, or magnesium carbonate, oxide, or hydroxide can be reacted with concentrated nitric acid obtained from the nitric acid concentrator and the resulting concentrated magnesium nitrate solution can be used to augment the concentrated magnesium nitrate solution employed for fortification purposes.

The following example sets forth a specific embodiment of the invention. It is to be understood, however, that this example is purely illustrative and not to be construed as a limitation of the invention. In the following example cellulose was nitrated to produce a nitrocellulose containing approximately 12.10% nitrogen suitable for any of the well-known uses to which nitrocellulose of this degree of substitution is commonly employed. All amounts are in terms of pounds per pound of nitrocellulose produced.

*Example 1*

Previously dried shredded chemical cellulose was dipped and nitrated for 10 minutes at about 50° C., employing 21.050 lb. of mixed nitrating mixture for each 0.646 lb. of cellulose. The nitrating mixture, previously heated to approximately 50° C., was introduced simultaneously with the cellulose into the nitrating vessel provided with efficient means of agitation, and agitation was maintained throughout the nitration reaction. The nitrating mixture contained 13.683 lb. $HNO_3$, 4.315 lb. magnesium nitrate, and 3.052 lb. water, which on a percentage basis amounts to approximately 65.0% $HNO_3$, 20.5% magnesium nitrate, and 14.5% water. Following nitration the nitrocellulose was in equilibrium with 20.633 lb. spent nitrating mixture composed of 13.098 lb. $HNO_3$, 4.315 lb. magnesium nitrate, and 3.220 lb. water, which on a percentage basis amounts to approximately 63.5% $HNO_3$, 20.9% magnesium nitrate, and 15.6% water. 0.585 lb. $HNO_3$ was consumed in the nitration for each pound of nitrocellulose produced.

The slurry of nitrocellulose in spent nitrating mixture was discharged to a centrifuge where 19.636 lb. of spent nitrating mixture was separated from the nitrocellulose and was recovered and stored. The resulting cake or mat of nitrocellulose still retained 0.997 lb. spent nitrating mixture per pound of nitrocellulose.

Immediately after separation of the bulk of spent nitrating mixture, which operation required about 1½ minutes, the nitrocellulose was subjected to a rapid displacement wash in the centrifuge with 1.131 lb. of fresh 60% nitric acid substantially free of magnesium nitrate, requiring about 10 seconds to apply the wash, and 1.131 lb. of discharge composed of 0.699 lb. $HNO_3$, 0.126 lb. magnesium nitrate, and 0.306 lb. water was recovered. On a percentage basis the above displacement wash discharge contained approximately 61.7% $HNO_3$, 11.1% magnesium nitrate, and 27.2% water.

Immediately after the displacement wash, the nitrocellulose was subjected to a series of four washes in rapid succession, in which the discharge from the first wash was recovered, and in which the discharge from each succeeding wash was recycled to the preceding wash. The first wash contained approximately 42% $HNO_3$, the second wash approximately 32% $HNO_3$, the third wash approximately 20% $HNO_3$, and the fourth and final wash was water. Each wash consisted of approximately 0.1 gallon per pound of nitrocellulose, each wash requiring approximately 10 seconds to apply, and each succeeding wash in turn being applied without time lapse between washes. The discharge from the first wash amounted to 1.089 lb. per pound of nitrocellulose and was composed of 0.595 lb. $HNO_3$, 0.075 lb. magnesium nitrate, and 0.419 lb. water. On a percentage basis this amounts to approximately 54.6% $HNO_3$, 6.9% magnesium nitrate, and 38.5% water.

The washed nitrocellulose was then withdrawn from the system for conventional subsequent purification, viscosity adjustment, and dehydration. The nitrocellulose withdrawn from the system contained 0.093 lb. $HNO_3$ and 0.013 lb. magnesium nitrate per pound of nitrocellulose. This nitric acid and magnesium nitrate remaining in the washed nitrocellulose were considered lost in the system. On the basis of 0.997 lb. spent nitrating mixture remaining in the nitrocellulose after separating the bulk of spent nitrating mixture from the nitrocellulose, it is evident that 0.54 lb. $HNO_3$ and 0.195 lb. of magnesium nitrate per pound of nitrocellulose were recovered for reuse in the process by the displacement wash and the four succeeding washes as set forth above. This amounts to approximately 85.5% recovery of $HNO_3$ and 93.5% recovery of magnesium nitrate values from the retained spent nitrating mixture remaining in the nitrocellulose after separating the bulk of spent nitrating mixture from the nitrocellulose.

It should be noted that the amount of $HNO_3$ consumed in the nitration, 0.585 lb., and the amount of $HNO_3$ lost in the system by being withdrawn in the washed nitrocellulose, 0.093 lb., total 0.678 lb., and this is balanced by the 0.678 lb. of $HNO_3$ introduced into the system in the 1.131 lb. of fresh 60% nitric acid employed as the displacement wash.

18.759 lb. of the recovered spent nitrating mixture was fortified with 1.803 lb. of 98.5% nitric acid and 0.490 lb. of 80% magnesium nitrate solution to produce 21.050 lb. of reconstituted nitrating mixture which was recycled as the nitrating mixture for the nitration reaction. This fortified mixture balances in amount and composition the initial nitrating mixture.

The 98.5% nitric acid used to fortify the spent nitrating mixture was obtained by concentrating the remainder of the recovered spent nitrating mixture amounting to 0.877 lb., the discharge from the displacement wash amounting to 1.131 lb., and the discharge from the first wash amounting to 1.089 lb. in a nitric acid concentrator using approximately 72% magnesium nitrate solution as the dehydrating agent.

The 80% magnesium nitrate solution used to fortify the spent nitrating mixture was obtained by concentrating magnesium nitrate solution from the nitric acid concentrator, and derived from the nitric acid concentrator feed solution made up from the remaining spent nitrating mixture, the discharge from the displacement wash, and the discharge from the first wash, augmented with 0.013 lb. of fresh magnesium nitrate added to the system to replace that lost in the system by being removed in the washed nitrocellulose. The fresh magnesium nitrate was obtained by reacting 0.007 lb. magnesium carbonate with 0.018 lb. of fresh 60% nitric acid per pound of nitrocellulose.

It is evident from the foregoing description that this invention provides a continuous system for the production of nitrocellulose employing nitrating mixtures containing nitric acid, magnesium nitrate, and water as essential ingredients. In this system all of the fresh nitric acid required to replace that consumed in the nitration and lost in the system, and thus keep the system in balance with respect to nitric acid requirements, is introduced into the system as the important and necessary displacement wash with fresh nitric acid. Moreover, in this system a substantial part of the nitric acid and magnesium nitrate values in the retained spent nitrating mixture remaining in the nitrocellulose after separating the bulk of spent nitrating mixture is recovered and re-used in the system.

This is a continuation-in-part of our copending application, Serial No. 327,147, filed December 20, 1952, now abandoned.

What we claim and desire to protect by Letters Patent is:

1. A continuous system for the production of nitric acid esters of cellulose which comprises subjecting cellulose to a nitration reaction in which cellulose is reacted with an excess of nitrating mixture essentially containing nitric acid, magnesium nitrate, and water, the ratio of magnesium nitrate to water being at least about 1.2:1 and not more than about 2.2:1 by weight, and the nitric acid being present in an amount sufficient to yield a nitrocellulose having a nitrogen content of from about 11% to about 13.5% by weight; recovering spent nitrating mixture from the nitrocellulose; thereafter subjecting the nitrocellulose to a rapid displacement wash; recovering the discharge from the displacement wash; subjecting the nitrocellulose to a series of aqueous nitric acid washes in rapid succession after the displacement wash in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash, and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

2. A continuous system for the production of nitric acid esters of cellulose which comprises subjecting cellulose to a nitration reaction in which cellulose is reacted with an excess of nitrating mixture essentially containing between about 45% and about 94% nitric acid, between about 3.3% and about 34% magnesium nitrate, and between about 2.7% and about 21% water by weight, the ratio of magnesium nitrate to water being at least about 1.2:1 and not more than about 2.2:1 to produce nitrocellulose; recovering spent nitrating mixture from the nitrocellulose; thereafter subjecting the nitrocellulose to a rapid displacement wash; recovering the discharge from the displacement wash; subjecting the nitrocellulose to a series of aqueous nitric acid washes in rapid succession after the displacement wash in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash, and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

3. A continuous system for the production of nitric acid esters of cellulose which comprises subjecting cellulose to a nitration reaction in which cellulose is reacted with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; recovering spent nitrating mixture from the nitrocellulose; thereafter subjecting the nitrocellulose to a rapid displacement wash; recovering the discharge from the displacement wash; subjecting the nitrocellulose to a series of aqueous nitric acid washes in rapid succession after the displacement wash in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash, and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

4. A continuous system for the production of nitric acid esters of cellulose which comprises subjecting cellulose to a nitration reaction in which cellulose is reacted with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; recovering spent nitrating mixture from the nitrocellulose; thereafter subjecting the nitrocellulose to a rapid displacement wash; recovering the discharge from the displacement wash; subjecting the nitrocellulose to a series of aqueous nitric acid washes in rapid succession after the displacement wash, in which each succeeding washing liquid is of decreased nitric acid concentration approaching 0 as the limit, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in HNO$_3$ content to the nitric acid consumed in the nitration and lost in the system.

5. A continuous system for the production of nitric acid esters of cellulose which comprises subjecting cellulose to a nitration reaction in which cellulose is reacted with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; recovering spent nitrating mixture from the nitrocellulose; thereafter subjecting the nitrocellulose to a rapid displacement wash; recovering the discharge from the displacement wash; subjecting the nitrocellulose to a series of aqueous nitric acid washes in rapid succession after the displacement wash, in which each succeeding washing liquid is of decreased nitric acid concentration, the final washing liquid being water, and in which the discharge from the first wash is recovered and the discharge from each succeeding wash is recycled to the preceding wash; withdrawing the washed nitrocellulose from the system; fortifying part of the recovered spent nitrating mixture with the concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in HNO$_3$ content to the nitric acid consumed in the nitration and lost in the system.

6. A continuous system for the production of nitric acid esters of cellulose which comprises subjecting cellulose to a nitration reaction in which cellulose is reacted with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; centrifuging the bulk of spent nitrating mixture from the nitrocellulose and recovering said mixture; thereafter subjecting the nitrocellulose to a rapid centrifugal displacement wash; recovering the discharge from the displacement wash; subjecting the nitrocellulose to a series of aqueous nitric acid centrifugal washes in rapid succession immediately after the displacement wash, in which each succeeding washing liquid is of decreased nitric acid concentration approaching 0 as the limit, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in HNO$_3$ content to the nitric acid consumed in the nitration and lost in the system.

7. A continuous system for the production of nitric acid esters of cellulose which comprises subjecting cellulose in bulk form to a nitration reaction in which said cellulose is reacted in slurry with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; centrifuging the bulk of spent nitrating mixture from the nitrocellulose and recovering said mixture; thereafter subjecting the nitrocellulose to a rapid centrifugal displacement wash; recovering the discharge from the displacement wash; subjecting the nitrocellulose to a series of aqueous nitric acid centrifugal washes in rapid succession immediately after the displacement wash, in which each succeeding washing liquid is of decreased nitric acid concentration approaching 0 as the limit, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in HNO$_3$ content to the nitric acid consumed in the nitration and lost in the system.

8. A continuous system for the production of nitric acid esters of cellulose which comprises subjecting cellulose in bulk form to a nitration reaction in which said cellulose is reacted in slurry with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; centrifuging the bulk of spent nitrating mixture from the nitrocellulose and recovering said mixture, thereafter subjecting the nitrocellulose to a rapid centrifugal displacement wash; recovering the discharge from the displacement wash; subjecting the nitrocellulose to a series of aqueous nitric acid centrifugal washes in rapid succession immediately after the displacement wash, in which each succeeding washing liquid is of decreased nitric acid concentration, the final washing liquid being water, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

9. A continuous system for the production of nitric acid esters of cellulose which comprises subjecting cellulose to a nitration reaction in which cellulose is reacted with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; separating the bulk of spent nitrating mixture from the nitrocellulose with suction and recovering said mixture; thereafter subjecting the nitrocellulose to a rapid suction displacement wash; recovering the discharge from the displacement wash; subjecting the nitrocellulose to a series of aqueous nitric acid suction washes in rapid succession immediately after the displacement wash, in which each succeeding washing liquid is of decreased nitric acid concentration approaching 0 as the limit, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

10. A continuous system for the production of nitric acid esters of cellulose which comprises subjecting cellulose in bulk form to a nitration reaction in which said cellulose is reacted in slurry with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; separating the bulk of spent nitrating mixture from the nitrocellulose with suction and recovering said mixture; thereafter subjecting the nitrocellulose to a rapid suction displacement wash; recovering the discharge from the displacement wash; subjecting the nitrocellulose to a series of aqueous nitric acid suction washes in rapid succession immediately after the displacement wash in which each succeeding washing liquid is of decreased nitric acid concentration approaching 0 as the limit, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

11. A continuous system for the production of nitric acid esters of cellulose which comprises subjecting cellulose in bulk form to a nitration reaction in which cellulose is reacted in slurry with an excess of nitrating mixture essentially containing between about 45% and about 80% nitric acid, between about 10% and about 34% magnesium nitrate and between about 7% and about 21% water by weight, the ratio of magnesium nitrate to water being at least about 1.2:1 and not more than about 2.2:1 to produce nitrocellulose; centrifuging the bulk of spent nitrating mixture from the nitrocellulose and recovering said mixture; thereafter subjecting the nitrocellulose to a rapid centrifugal displacement wash; recovering the discharge from the displacement wash; subjecting the nitrocellulose to a series of centrifugal washes in rapid succession immediately after the displacement wash, in which the first washing liquid contains approximately 40 to 50% nitric acid, the second approximately 25 to 40% nitric acid, the third approximately 15 to 25% nitric acid, with the final washing liquid being water, and in which the discharge from the first wash is recovered and the discharge from each succeeding wash is recycled to the preceding wash; withdrawing the washed nitrocellulose from the system; fortifying part of the recovered spent nitrating mixture with concentrated nitric acid and concentrated magnesium nitrate and recycling the fortified mixture as the nitrating mixture for the nitration reaction, said concentrated nitric acid being obtained by concentrating the remainder of the recovered spent nitrating mixture, the recovered discharge from the displacement wash and the recovered discharge from the first wash in a nitric acid concentrator using a magnesium nitrate dehydrating agent, said concentrated magnesium nitrate being obtained by concentrating the magnesium nitrate from the nitric acid concentrator and adding fresh magnesium nitrate to replace that lost in the system; and supplying fresh nitric acid of about 60% to about 75% concentration to the system as the displacement wash and in an amount substantially equivalent in $HNO_3$ content to the nitric acid consumed in the nitration and lost in the system.

No references cited.